US010185034B2

(12) United States Patent
Smith et al.

(10) Patent No.: US 10,185,034 B2
(45) Date of Patent: Jan. 22, 2019

(54) POSITIONING SYSTEM USING RADIO FREQUENCY SIGNALS

(71) Applicant: Caterpillar Inc., Peoria, IL (US)

(72) Inventors: David William Smith, Queensland (AU); Peter John Broughton, Victoria (AU)

(73) Assignee: Caterpillar Inc., Deerfield, IL (US)

(*) Notice: Subject to any disclaimer, the term of this patent is extended or adjusted under 35 U.S.C. 154(b) by 312 days.

(21) Appl. No.: 15/021,799

(22) PCT Filed: Sep. 20, 2013

(86) PCT No.: PCT/US2013/061028
§ 371 (c)(1),
(2) Date: Mar. 14, 2016

(87) PCT Pub. No.: WO2015/041687
PCT Pub. Date: Mar. 26, 2015

(65) Prior Publication Data
US 2016/0231426 A1    Aug. 11, 2016

(51) Int. Cl.
*G01S 3/02* (2006.01)
*G01S 17/93* (2006.01)
(Continued)

(52) U.S. Cl.
CPC .......... *G01S 17/936* (2013.01); *G01S 5/0263* (2013.01); *G01S 5/14* (2013.01); *G01S 7/4808* (2013.01);
(Continued)

(58) Field of Classification Search
CPC ...... G01S 17/936; G01S 17/023; G01S 17/06; G01S 17/88; G01S 5/0263; G01S 5/14;
(Continued)

(56) References Cited

U.S. PATENT DOCUMENTS 5,483,455 A   1/1996  Lay et al.
8,195,342 B2* 6/2012  Anderson ............ G05D 1/0088
                                                    700/253
(Continued)

FOREIGN PATENT DOCUMENTS

CN   101672907      3/2010
CN   201681155     12/2010
(Continued)

OTHER PUBLICATIONS

International Search Report dated Apr. 29, 2014, in Patent Application No. PCT/US2013/061032 by the Korean Intellectual Property Office (2 pages).

(Continued)

*Primary Examiner* — Chuong P Nguyen
(74) *Attorney, Agent, or Firm* — Finnegan, Henderson, Farabow, Garrett & Dunner, LLP

(57) ABSTRACT

A method for determining a position of a machine in a worksite is disclosed. The method may include determining, using a Lidar unit on the machine, input data. The input data may be associated with distances between the Lidar unit and respective light-reflective points in the worksite. The method may also include transmitting a radio-frequency communication between a first signal device at a known location within the worksite and a second signal device located on the machine. Further, the method may include determining position data for the machine based on at least the radio frequency communication. The method may also include determining a position of the machine based on the position data and the input data.

18 Claims, 6 Drawing Sheets

(51) Int. Cl.
*G01S 17/02* (2006.01)
*G01S 17/06* (2006.01)
*G01S 17/88* (2006.01)
*G01S 7/48* (2006.01)
*G01S 5/02* (2010.01)
*G01S 5/14* (2006.01)
*G05D 1/02* (2006.01)
*G01C 21/26* (2006.01)

(52) U.S. Cl.
CPC ............ *G01S 17/023* (2013.01); *G01S 17/06* (2013.01); *G01S 17/88* (2013.01); *G01C 21/26* (2013.01); *G05D 1/024* (2013.01); *G05D 1/0274* (2013.01); *G05D 2201/021* (2013.01)

(58) Field of Classification Search
CPC .... G01S 7/4808; G05D 1/024; G05D 1/0274; G01C 21/26
USPC .......................................... 342/457; 701/408
See application file for complete search history.

(56) References Cited

U.S. PATENT DOCUMENTS

| | | | |
|---|---|---|---|
| 8,301,374 B2 | 10/2012 | Surampudi et al. | |
| 8,655,513 B2* | 2/2014 | Vanek | G01S 17/58 356/4.01 |
| 8,965,641 B2* | 2/2015 | Smith | G01S 17/42 356/4.01 |
| 9,383,753 B1* | 7/2016 | Templeton | G05D 1/0246 |
| 2002/0130806 A1 | 9/2002 | Taylor, Jr. et al. | |
| 2004/0239552 A1 | 12/2004 | Chon et al. | |
| 2007/0027612 A1 | 2/2007 | Barfoot et al. | |
| 2007/0073473 A1 | 3/2007 | Altan et al. | |
| 2008/0068267 A1 | 3/2008 | Huseth et al. | |
| 2008/0262718 A1* | 10/2008 | Farwell | G05D 1/0234 701/445 |
| 2010/0063651 A1* | 3/2010 | Anderson | G05D 1/0088 701/2 |
| 2010/0110412 A1 | 5/2010 | Basu et al. | |
| 2011/0262008 A1 | 10/2011 | Holicki et al. | |
| 2012/0033196 A1* | 2/2012 | Vanek | G01S 7/4808 356/4.01 |
| 2012/0163656 A1 | 6/2012 | Wang et al. | |
| 2013/0041549 A1* | 2/2013 | Reeve | B62D 15/025 701/28 |
| 2013/0103298 A1 | 4/2013 | Becker et al. | |
| 2015/0097412 A1* | 4/2015 | Smith | E21C 41/16 299/1.05 |
| 2015/0106004 A1* | 4/2015 | Taylor | E02F 3/842 701/300 |
| 2016/0223673 A1* | 8/2016 | Smith | G01S 17/89 |
| 2017/0357267 A1* | 12/2017 | Foster | A01B 79/005 |

FOREIGN PATENT DOCUMENTS

| | | |
|---|---|---|
| JP | 2011191239 | 9/2011 |
| JP | 2012-525587 | 10/2012 |
| JP | 2013173416 | 9/2013 |
| WO | WO 2008/094993 | 8/2008 |
| WO | 2015041687 | 3/2015 |

OTHER PUBLICATIONS

International Search Report dated Apr. 29, 2014, in Patent Application No. PCT/US2013/061028 by the Korean Intellectual Property Office (2 pages).

U.S. National Stage Application of David William Smith et al. titled "Positioning System," filed Mar. 14, 2016.

* cited by examiner

POSITIONING SYSTEM USING RADIO FREQUENCY SIGNALS

CLAIM FOR PRIORITY

This application is a U.S. National Phase entry under 35 U.S.C. § 371 from PCT International Application No. PCT/US2013/061028, filed Sep. 20, 2013, which is incorporated herein by reference.

TECHNICAL FIELD

The present disclosure relates generally to a positioning system for a mobile object, such as a mobile machine. The positioning system is especially relevant to high-precision position determination of such mobile objects in underground environments.

BACKGROUND

Machines such as, for example, haul trucks, drills, loaders, conveyors, and other types of heavy equipment are commonly used in underground mining applications to perform a variety of tasks. Unlike above-ground mining applications, underground mining sites do not have access to GPS (Global Positioning System) signals, yet knowledge of a machine's on-site location is desirable, for example, with respect to the site geography.

In some underground mining applications, Lidar (Light Detection and Ranging; also referred to as light radar) positioning systems may be used to track the location of a machine with respect to a worksite. Lidar systems scan portions of the surrounding environment in proximity of the machine. Each Lidar scan captures data representative of the shape of the scanned portion of the worksite. The captured data is then compared to references for a known map of the worksite, and the positioning system infers the position of the machine based on the reference that correlates with the captured data. The positioning system is able to track the movement of the machine by subsequently capturing a further Lidar scan, and similarly comparing this captured data with the mapped references.

In some applications, however, it may be difficult for Lidar systems to determine the location of a machine based solely on correlating the captured data with the mapped references. For instance, the captured data may represent shapes that are not unique to a specific location. Additionally, comparing the captured data with the map can be computationally intensive, causing processing systems to be slow in finding a matching reference. Further, there may be objects at the worksite that do not have a permanent location or that have been newly added. Such objects may cause complications for Lidar systems that are trying to match shapes in the worksite environment to a pre-existing map if those shapes are not included in the pre-existing map. This may result in the Lidar system losing track of the position of the machine, requiring manual intervention by an operator on the machine, who must identify the machine's position and re-seed the positioning system.

In some applications, it may be desirable to monitor mobile objects other than mobile machines. For example, it may be desirable to determine the position of some other mobile device in an underground environment.

The disclosed positioning system is directed to overcoming or at least ameliorating one or more of the problems set forth above.

SUMMARY

In one aspect, there is disclosed a method for determining a position of a machine in a worksite. The method comprises determining input data from a Lidar survey by a Lidar unit on the machine. The input data is associated with distances between the Lidar unit and respective light-reflective points in the worksite. The method further comprises communicating by a radio-frequency communication between a first signal device at a known location within the worksite and a second signal device located on the machine. The method further comprises determining position data for the machine based on at least the radio frequency communication, and determining a position of the machine based on the position data and the input data.

In another aspect, there is disclosed a system for determining a position of a machine in a worksite. The system comprises a Lidar unit for attaching to the machine and configured to capture a Lidar survey to generate input data, the input data being associated with distances between the Lidar unit and respective light-reflective points in the worksite. The system further comprises a radio frequency communication system comprising a first signal device for positioning at a known location within the worksite and a second signal device for attaching to the machine. The communication system is configured for performing a radio frequency communication between the first and second signal devices. The system further comprises a control system in communication with the lidar unit and the radio frequency communication system. The control system is configured to determine position data for the machine based on at least the radio frequency communication, and determine a position of the machine based on the position data and the input data.

In another aspect, there is disclosed a method for determining a position of a mobile machine, or other mobile object. The machine or other object is located in an underground mine comprising at least one tunnel. The tunnel has a plurality of designated loading locations for loading ore onto a mobile machine. The method comprises configuring first and second ranging devices to perform an ultra-wideband radio frequency communication therebetween. The first ranging device is at a known location in the mine and having a field of operation, within the tunnel, over which the first ranging device has a line of sight. The field of operation extends along the tunnel passed at least two of the designated loading locations. The second ranging device is associated with the machine or other mobile object and is located in the field of operation. The method further comprises transmitting a first ultra-wideband radio frequency signal of the communication from one of the ranging devices. The method additionally comprises receiving a ultra-wideband radio frequency response signal of said communication from the other of the ranging devices. Additionally the method comprises determining a time-based characteristic associated with the transmitting of the first ultra-wideband radio frequency signal and the receiving of the ultra-wideband radio frequency response signal. The method further comprises determining a position of the second ranging device, based on the time-based characteristic.

Optionally, the position may be determined with respect to a mine of the map that is stored in a memory system. Optionally, the method may further comprise: identifying a mounting position in the mine at which the first ranging device has a field of operation, within the tunnel, over which the first ranging device has a line of sight, said field of operation extending along the tunnel passed at least two of the designated loading locations; and mounting the first ranging device at the mounting position. The method may further comprise storing, in the memory system, the identified mounting position as said known location of the first ranging device with respect to the map of mine. In one embodiment, the first ranging device is located at an end of the tunnel. Optionally, the mobile object is a load-haul-dump mining machine, wherein the method further comprises mounting the second ranging device to a rear portion of the machine.

In another aspect, there is disclosed another method for determining a position of a mobile machine, or other mobile object. The machine or other object is located in an underground mine comprising at least one tunnel. The tunnel has a plurality of designated loading locations for loading ore onto a mobile machine. The method comprises configuring first and second ranging devices to perform an ultra-wideband radio frequency communication therebetween. The first ranging device is at a known location in the mine and having a field of operation, within the tunnel, over which the first ranging device has a line of sight. The field of operation extends along the tunnel passed at least two of the designated loading locations. The second ranging device is associated with the mobile object and located in the field of operation. The method comprises transmitting a first ultra-wideband radio frequency signal of said communication from one of the ranging devices. The method further comprises receiving a first ultra-wideband radio frequency response signal of said communication from the other of the first and second ranging devices. The method also comprises determining a first time-based characteristic associated with transmitting a the first ultra-wideband radio frequency signal and the receiving of the ultra-wideband radio frequency response signal. The method also comprises transmitting a second ultra-wideband radio frequency signal from one of the second ranging device and a third ranging device. The third ranging device is at another known location in the worksite at an opposite end of the tunnel to the first signal device. The second ranging device is between the first and third ranging devices. The method further comprises receiving a second ultra-wideband radio frequency response signal from the other of the second or third ranging devices. Additionally, the method comprises determining a second time-based characteristic associated with transmitting of the second ultra-wideband radio frequency signal and the receiving of the second ultra-wideband radio response frequency signal. The method also comprises determining a position of the second ranging device, based on the first and second time-based characteristics.

In another aspect, there is disclosed a system for determining a position of a mobile object, for example a mobile machine, in an underground mine. The mine comprises at least one tunnel, the tunnel having a plurality of designated loading locations for loading ore onto a mobile machine. The system comprises a memory system for storing data representative of a map of the mine. The system further comprises a first ranging device at a known location in the mine and having a field of operation, within the tunnel, over which the first ranging device has a line of sight. The field of operation extends along the tunnel, passed at least two of the designated loading locations. The system further comprises a second ranging device associated with the mobile object and located in the field of operation. The first and second ranging devices are configured to perform an ultra-wideband radio frequency communication for determining a time-based characteristic associated with transmitting a first ultra-wideband radio frequency signal from one of the ranging devices and receiving a ultra-wideband radio frequency response signal from the other of the ranging devices. The system further comprises a controller configured to determine a position of the second ranging device with respect to the map, based on the time-based characteristic.

As used herein, the term "comprises" (and grammatical variants thereof) is used inclusively and does not exclude the existence of additional features, elements or steps.

BRIEF DESCRIPTION OF THE DRAWINGS

Various aspects and features of an embodiment of the invention will be described with reference to the following figures which are provided for the purposes of illustration and by way of non-limiting example only.

DETAILED DESCRIPTION

Figure 1:
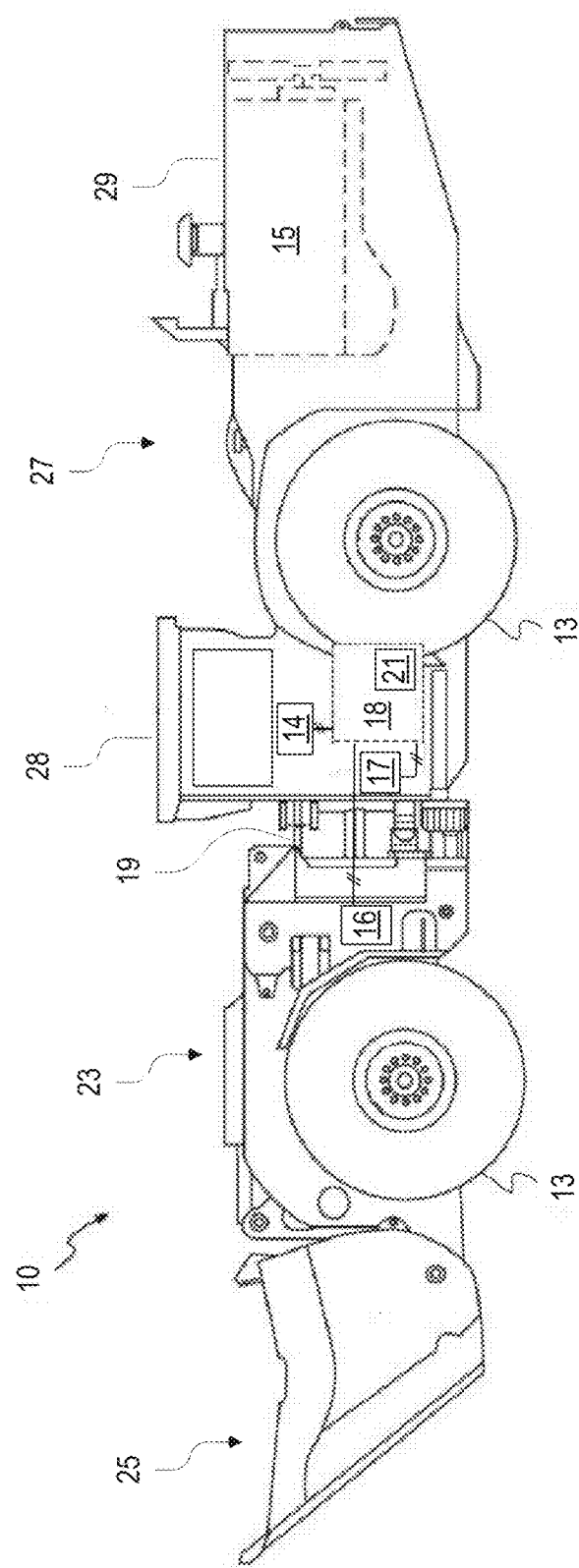
FIG. 1 is a pictorial illustration of an exemplary disclosed machine.

FIG. 1 illustrates a machine 10 having an exemplary disclosed positioning system. Machine 10 embodies a mobile machine configured to perform one or more operations associated with an industry such as mining, construction, farming, transportation, or any other industry known in the art. For example, machine 10 may be a load-moving machine such as a haul truck, a loader, an excavator, a wheel tractor, a scraper, or any other like machine. Machine 10 may be used above-ground or underground. For example, FIG. 1 more specifically illustrates an underground mining load-haul-dump (LHD) loader, which may be used to access a load site in a mine (e.g. from a drawpoint), haul a load away from the load site, and release the load at a dump site (e.g. at an ore pass). Machine 10 may be manually controlled, semi-autonomously controlled, or fully-autonomously controlled. Machine 10 includes one or more traction devices that propel machine 10. In the exemplified embodiment, machine 10 has four traction devices in the form of respective wheels 13. The machine 10 also includes, among other things, movement sensors 14 that sense various movements of machine 10, and a power source 15 orientation sensing devices 16, 17, and a control system comprising controller 18.

The machine 10 has an articulation joint 19 which divides the machine 10 into a front portion 23, including two wheels 13 and ending in bucket 25, and a rear portion 27, including the controller 18, another two wheels 13, a cabin 28 for an person, and a rear end 29 behind the two wheels 13 of the rear portion 27 and holding the power source 15. The front portion 23 and rear portion 27 pivot about the articulation joint 19 to effect steering of the machine 10. The orientation sensing devices 16, 17 each measure information which independently may be used to determine the orientation of least the front portion 23 of the machine 10. For example, one of the orientation sensing devices 16 is a digital compass located on the front portion 23 of the machine 10, forward of the articulation joint 19. The other of the orientation sensing devices 17 is an articulation sensor which measures an angle indicative or other parameter that is indicative of the angle of rotation of the articulation joint 19, and hence indicates the disposition of the front portion 23 of the machine 10 with respect to the rear portion 27 of the machine 10. In the illustrated embodiment, the articulation sensor is located on the rear portion 27 of the machine, adjacent the articulation joint 19.

Controller 18 is in communication with movement sensors 14, orientation sensors 16, 17, power source 15, and/or drive traction devices 13, and may be configured to regulate operation of power source 15 in response to various inputs, for example, from an operator input device and/or movement sensors 14, to drive the traction devices to propel machine 10 in a desired manner. Controller 18 may also receive information from movement sensors 14 indicative of, for example, velocity, acceleration, and/or turning rate of machine 10, and may be configured to compute various motions, such as distance and direction traversed by machine 10, based on such information.

Controller 18 includes a processor (not shown), and a memory system 21 comprised of a memory module and/or a storage module. Optionally, one or more of the processor, memory module, and/or storage module may be included together in a single apparatus. Alternatively, one or more of the processor, memory module, and/or storage module may be provided separately. The processor may include one or more known processing devices, such as a microprocessor. Memory module may include one or more devices, such as random-access memory (RAM), configured to store information used dynamically by controller 18 to perform functions related to the various operations of machine 10. The storage module may include any type of storage device or computer readable medium known in the art. For example, the storage module may comprise a magnetic, semiconductor, tape, optical, removable, non-removable, volatile, and/or non-volatile storage device. The storage module may store programs, algorithms, maps, look-up tables, and/or other information associated with determining a position of machine 10 in worksite 20. The functions of both the storage module and memory module may be performed by a single memory/storage device.

In various exemplary embodiments, controller 18 is utilized in determining the position of machine 10 as will be described in greater detail below.

Figure 2:
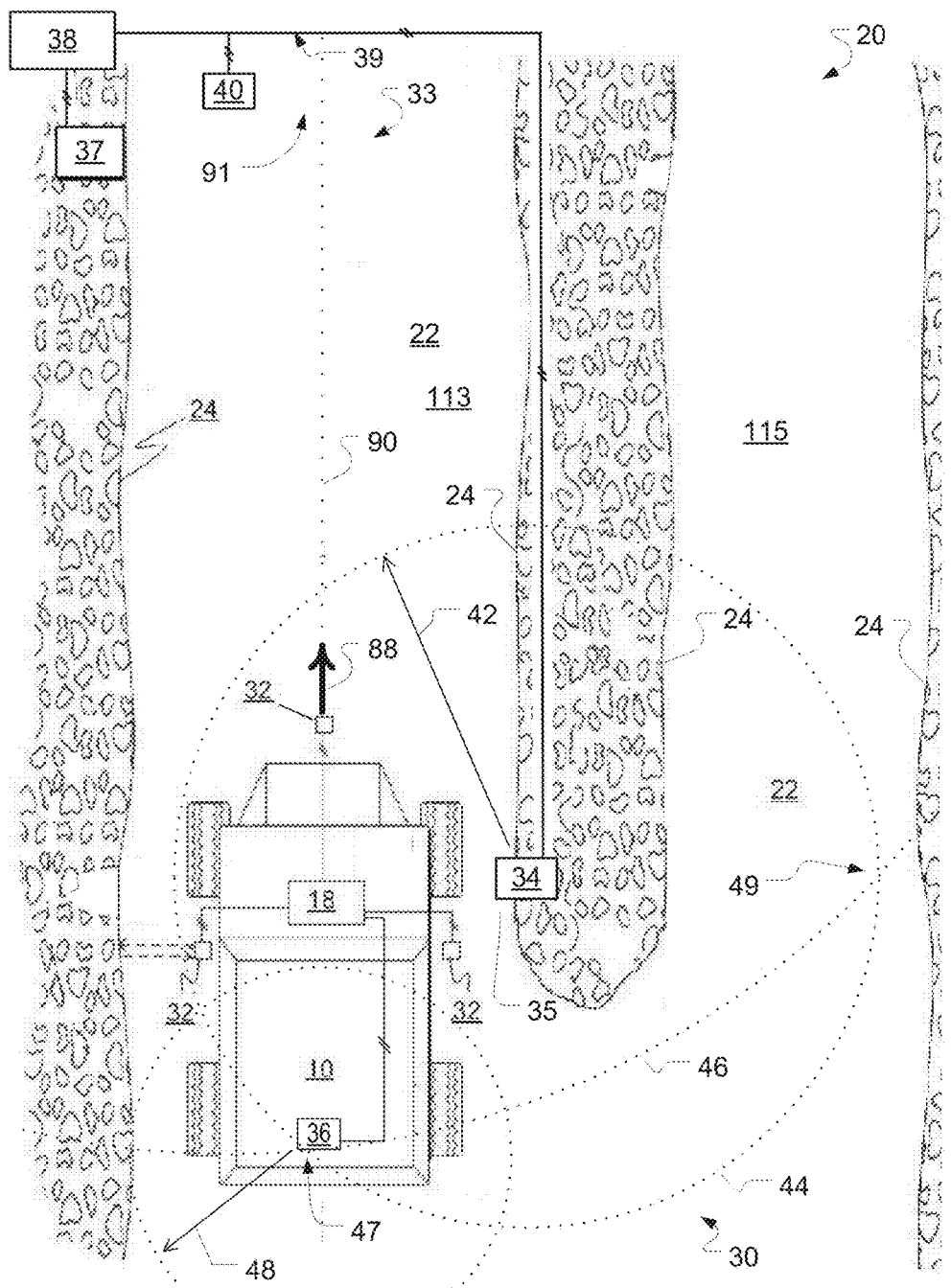
FIG. 2 is a pictorial illustration of an exemplary positioning system that may be used with a mobile object, such as the machine of FIG. 1, the machine being illustrated in a simplified manner.

FIG. 2 illustrates machine 10, shown in a simplified manner, performing a task at in worksite 20. Worksite 20 may be any worksite having a roadway 22 traversable by machine 10, but exemplary embodiments are particularly suited to worksites which do not having access to a GPS navigation system. For the exemplary embodiments illustrated herein, worksite 20 is an underground mine site, which does not have access to GPS navigation systems. Roadway 22 is bordered by side walls 24, such as walls of an underground tunnel, and may have a ceiling, such as a tunnel roof (not shown) disposed above roadway 22. In some applications, there may also be objects other than side walls 24 such as other machines, barrels, poles, geological features, and other like obstacles disposed in various locations at worksite 20 relative to roadway and/or the additional objects described above. In various situations, it may be desirable to ascertain position information of machine 10 in worksite 20. The position information may be used by machine 10 in navigating worksite 20. Alternatively, the position information may be used to monitor and gather data about how efficiently machine 10 and other machines in worksite 20 are performing various tasks.

In exemplary embodiments, a position of machine 10 in worksite 20 is determined by utilizing a positioning system 30. As illustrated in FIG. 2, positioning system 30 includes, among other things, controller 18, and an optical sensing device, which in the exemplified embodiment is Lidar unit 32. However, in other embodiments, the optical sensing device may be any may be any other device that uses optical electromagnetic radiation (i.e. infrared, visible or ultraviolet light) to obtain optical information related to roadway 22, sidewalls 24, the ceiling, or any other object associated with worksite 20. Lidar unit 32 is utilized to scan objects surrounding machine 10, such as roadway 22, side walls 24, the ceiling of an underground tunnel, and/or any other object associated with worksite 20, using light signals. Lidar unit 32 may be located on a frame and/or body of machine 10, such as at the front, back, side, top, and/or any other place on machine 10. In the example in FIG. 2, there are multiple Lidar units 32 disposed on machine 10. Each Lidar unit 32 located at a unique location on machine 10, specifically, the front and the respective sides. The Lidar unit 32 includes one or more sources light (i.e. infrared, visible or ultraviolet light), and/or one or more light detectors to survey the surrounding environment by obtaining information related to roadway 22, side walls 24, the ceiling, and/or any other object associated with worksite 20.

The light sources are lasers that emit light that reflects off of, for example, the surfaces of side walls 24 and/or other surfaces of objects in worksite 20 within a field of view of the Lidar unit 32. The light may be emitted by a single laser that is reflected by a rotating mirror to scan the portion of the worksite in the field of view. Alternatively, the light may be emitted by multiple lasers directed to different angles within the field of view so to radiate light across the field of view a non-scanning manner. One or more detectors of the Lidar unit 32 receive the reflected light and send signals to controller 18 indicative of the light received. Controller 18 then calculates distances to the various points on the surfaces. The calculated distances are based on the elapsed time between emission of the light and detection of the light, the distance to the surface being half of the elapsed time multiplied by the speed of light. However, since the elapsed times and the associated distances are intrinsically related, it is considered herein that either the elapsed time or the calculated distance may be considered to define distance data. In other embodiments, at least part of the controller 18 is integrated into Lidar unit 32. In this case, the Lidar unit 32 calculates the elapsed times or distances to the respective points on the surface(s) of the worksite that were scanned or otherwise surveyed by the Lidar unit 32. The Lidar unit 32 may then send the calculated times or distances to external components of the controller 18, or to some other processing system, for further analysis.

In one embodiment, at least one of Lidar units 32 is comprised of multiple Lidar devices treated as a single device by the controller 18. In such an embodiment, two Lidar devices are integrated back-to-back, to from one Lidar unit 32. Each Lidar device has a 180 degree field of view such that the Lidar unit 32 has a 360 degree field of view. The Lidar unit 32 may be mounted atop the machine 10, for example, on top of or raised above cabin 28, to provide the controller 18 with distance data for a 360 degree view around the machine 10. The distance data may be provided in terms of elapsed times or distances for respective angles with respect to a reference vector 88. As illustrated in FIG. 2, the reference vector 88 may, for example, be a tangential vector along a path 90 along the roadway 22, for example along a centerline of the roadway, and towards a reference end 91 of the roadway. By recording data for a 360 degree view, the Lidar unit 32 may potentially present distance data representing the entire worksite from the perspective of the Lidar unit's position in the worksite. However, topology of the worksite and the position of the Lidar unit 32 therein, some parts of the worksite might not be visible to the Lidar unit 32. Alternatively, some parts of the worksite may not be visible if the Lidar unit has a field of view less than 360 degrees. In either case, the presented distances data may represent only a portion or portions of the worksite that are visible from the Lidar unit 32.

Figure 3:
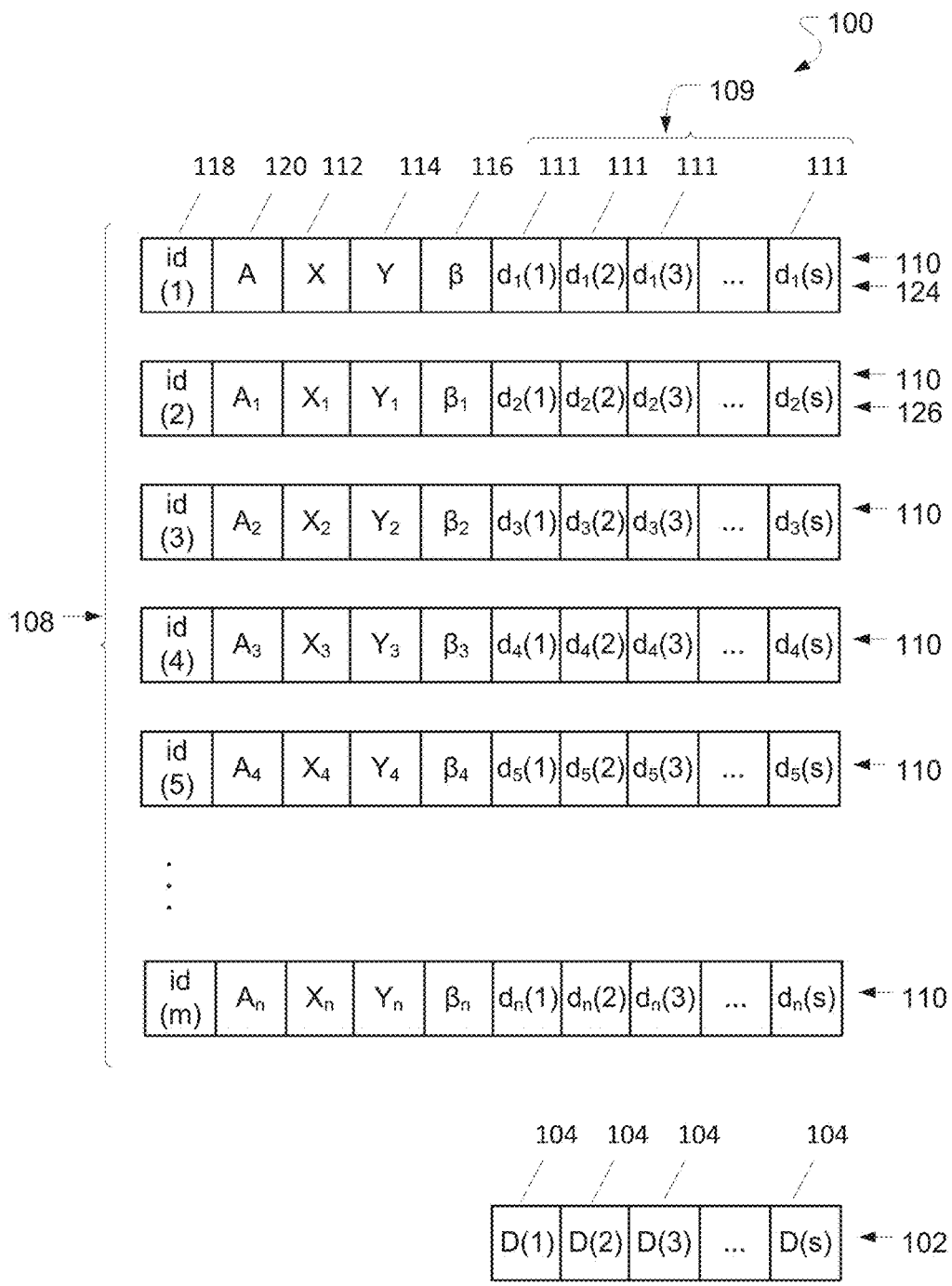
FIG. 3 is a conceptual representation of data which may used by the positioning system of FIG. 2 to determine a position of the machine.

FIG. 3 is a conceptual representation of data 100 that is analyzed by controller 18 to determine a position of Lidar unit 32 and the machine 10 on which it is mounted. The data 100 may be read from a memory system of the controller 18 on which data may be stored. However, in various embodiments, at least some of the data 100 is dynamically generated from stored data, such as a stored map of the mine. Other elements of data 100 may be read from other inputs to controller 18 such as from Lidar unit 32. The data 100 includes distance data derived from the Lidar unit 32. The distance data is a series of measured distance values, D(1) to D(s) 104, for each respective angles within the field of view and at known angular offsets with respect to the reference vector 88 or some other frame of reference. In FIG. 3, the distance data is represented as a linear one dimensional array. In other embodiments, the distance data may be indexed as a circular array. In one embodiment, in which the Lidar unit has a 360 degree field of view, the input data consists of 720 measured distance values 104, with the data elements for distance measurements that are radially spaced around the Lidar unit 32 in 0.5 degree increments. Based on the distance data, controller 18 may also estimate, calculate, and/or otherwise determine a shape of the scanned object or portion of the worksite. Some shape-related information can be extracted from the distance data by employing a mathematical filter. For example, the distance data may be transformed to a frequency domain and then passed through a high pass filter to identify edges or contour changes on the surface of the worksite. Other characterizing features of the distance data may be extracted using other known feature extraction algorithms. Such extracted information that characterizes the distance data can optionally be stored, instead of the raw distance values 104, as input data 102 for use by controller 18 in determining the position of machine 10. However, in the exemplary embodiment described, the input data 102 consists of the linear array of distance values D(1) to D(s).

The memory system 21 stores, amongst other things, data that represents a map of worksite 20. The map may be represented by data defining a collection of lines linking various coordinates in the worksite, for example, as in a DXF file of a mine map. The map may be representative of the entire worksite 20 or a portion thereof, such as at least one assigned tunnel 113 in the worksite 20, within which machine 10 is permitted or assigned to operate. The map may also represent other tunnels 115 in which machine 10 is not permitted or assigned to operate. During operation, controller 18 dynamically generates reference data 109 which are each indicative of a lidar survey from a particle reference position 118. For a given reference position 134, the reference data 109 is generated from the lidar map file by generating a theoretical Lidar survey based on the respective distances 111 from the reference position 134 to various points on the mine map. For example, the points may be points along lines of the mine map, which are representative of walls 24 of the worksite. In one embodiment, the points are spread around the reference position 134 so as to represent a Lidar survey have a 360 degree field of view about the reference position 134. In one embodiment, the distances 111, for convenience referred to herein as reference distance values, are spaced in 0.5 degree intervals about the reference position 134 so as to provide 720 reference distance values. Alternatively, if the Lidar unit 32 uses other spacing, the spacing of reference distance values may be matched to the spacing associated with Lidar unit 32.

The reference data 109 generated by controller 18 are represented in FIG. 3 as part of worksite data 108. The worksite data 108 consists of a set of reference items 110, numbering M references in total. In the illustration in FIG. 3, each reference item consists of a reference identifier 118, a reference position 134, reference data 109 for that reference position 134, and other data 116. The number M of reference items 110 is determined by the finite resolution of points on the map. Each point corresponds to a reference position 134 from which reference data 109 may be generated. In one embodiment, the map points (and reference data 109 generated therefrom) included in the worksite data 108 are restricted to those points within a limited region of worksite 20. For example, the worksite data 108 may be limited to points within a portion of the worksite 20 in which the machine 10 is assigned to operate. For example, in one embodiment, the controller 18 is programmed to limit the reference positions 134 in the worksite data 108 only to reference positions along a path 90 that runs along a longitudinally extending centerline of the roadway 22, and along which the machine 10 is assumed to operate. However, it is appreciated, that since in one embodiment the reference data 109 are dynamically derived, the worksite data 108 need not be stored in the memory system 21 of controller 21, provided it can be derived from the worksite map and any other data stored in the memory system 21. Accordingly, not all of the reference data that make up the worksite data 108 need to co-exist at the same time. In one embodiment, only one reference data 109 exists at any one time.

In other embodiments, all reference data 109 corresponding to the worksite data 108 may be concurrently stored in memory system 21. For example, the worksite data 108 may be derived by performing Lidar scans for respective positions within the worksite 20. Each Lidar scan may be pre-captured by mobile machine 10 or by another equivalently equipped and configured mobile machine or some other surveying tool. Each set of reference distance values 111 that make up a reference data 109 may then be derived in the same manner as the input data 102 so, for example, may similarly represent a Lidar survey for 360 degree field of view, represented by 720 reference distance values. Whether the worksite data is stored or is dynamically generated as required, it is convenient to refer to the worksite data as a dataset.

Reference identifier 118 may be used to index each reference item 110. For example, the reference identifier 118 may represent a starting address, e.g. in a random access memory, from which information in the corresponding reference item 110 may accessed. The reference position 134 corresponding to each reference data 109 may be stored as an x coordinate 112 and a y coordinate 114 with respective to a frame of reference. For example the x coordinate may be correspond to a position along and east/west axis and y may correspond to a position along a north/south axis. Alternatively, one of the coordinates 112 or 114 may represent a distance along the path 90 that runs along the roadway 22, e.g. along a longitudinally extending centerline of the roadway 22. In this case the worksite data 108 may consist of reference items 110 spread along the length of path 90. For example, the reference positions 134 may be spaced or generated to be spaced in 1 meter increments, along some or all of a tunnel that typically spans 50-200 m. Each reference data 109 is indicative of a specific orientation of a Lidar survey with respect to a frame of reference in the worksite 20. For example, a reference distance value $d_1(1)$ in reference item 124 may be aligned with reference vector 88 tangential to the machine's travel path 90. Another reference item 126 may have a frame of reference that is offset by an angle β (116) with respect to the reference vector. For example, a translation of 45 degrees may be employed so that for a 720 element matrix representing 360 degrees, vector 88 is aligned with element $d_2(91)$, rather than $d_2(1)$. In one embodiment, there are 16 reference items 110 generated for each mapped location in the worksite 20, with each of the 16 reference items 110 being angularly spaced in 22.5 degree increments about the reference vector 88 or other frame of reference. The reference items 110 that correspond to the same reference values 111, but for different angular offsets may be stored at separate memory addresses in the memory system of controller 18. Alternatively such angularly-varying reference items 110 may be derived or inferred from a single stored set of reference data 109 for the location in worksite. This may be achieved by biasing an index n so as to read a distance value, d(n), corresponding to an angular offset, β. This, in effect, results in controller 18 reading a reference item corresponding to a different angular offset, β.

As machine 10 moves within the worksite 20, machine 10 records input data 102 from a Lidar scan of its surrounding environment so that the machine 10 can determine its position within the worksite. Controller 18 analyzes the input data 102 by comparing it with the reference data 109 of each reference 110 to identify a reference data 109 to which the input data 102 is closely correlated. From the comparison, controller 18 identifies a best match between the input data and a reference item 110. Since each reference item 110 corresponds to a unique position in worksite 20 (in terms of location and orientation), controller 18 determines a position of machine 10 based on the corresponding reference position 134 of the reference data 109 that is correlated with the input data 102. The embodiment exemplified herein uses input data 102 comprised of measured distance values 104. However, in other embodiments the input data 102 may define a characterizing feature of the Lidar survey derived by applying a mathematical function or algorithm to the distance data measured distance values 104. In embodiments in which the input data 102 defines information extracted from the measured distance values 104, the reference data 109 may represent information extracted from corresponding the set of reference distance values 111, by applying the same mathematical function or algorithm used to derive the input data 102. In such a case, the extracted information may be stored as the reference data 109 instead of reference distance values 111.

During operation, positioning system 30 determines the position of machine 10 by comparing the input data 102 with comparison data. The comparison data represents reference data 109 for an area or areas on the map that constitute a subset of the area represented by the worksite data 108. Thus the comparison data may thus be considered to be a reference dataset consisting of N reference items 110, from ref(1) to ref(N) where N is less than the M items of the worksite data 108. In one embodiment, the reference items 110 that constitute the comparison data are dynamically generated as required, based on a corresponding reference position 134, which may also be dynamically generated. Therefore, the entire dataset of N reference items 110 need not be stored in memory at any one time. The composition of the comparison data is variable with time, to enable a different composition of reference items 110 each time the comparison data is it compared with the input data. During a tracking mode of the position system 30, the comparison data is a subset of worksite data 108 that is dynamically derived based on the most recently determined position of the machine 10. More specifically, during the tracking mode, the comparison data is dynamically derived to be limited to those references 110 that are associated with positions in the worksite that are near the most recently determined position. However, when the positioning system is first initialized (or if the positioning system loses track of the machine 10's position), there will be no relevant initial position on which such comparison data may be derived. Further, in some instances, it may be difficult for the positioning system 30 to quickly and/or accurately determine the initial position if the input data 102 matches more than one reference data 109.

Figure 4:
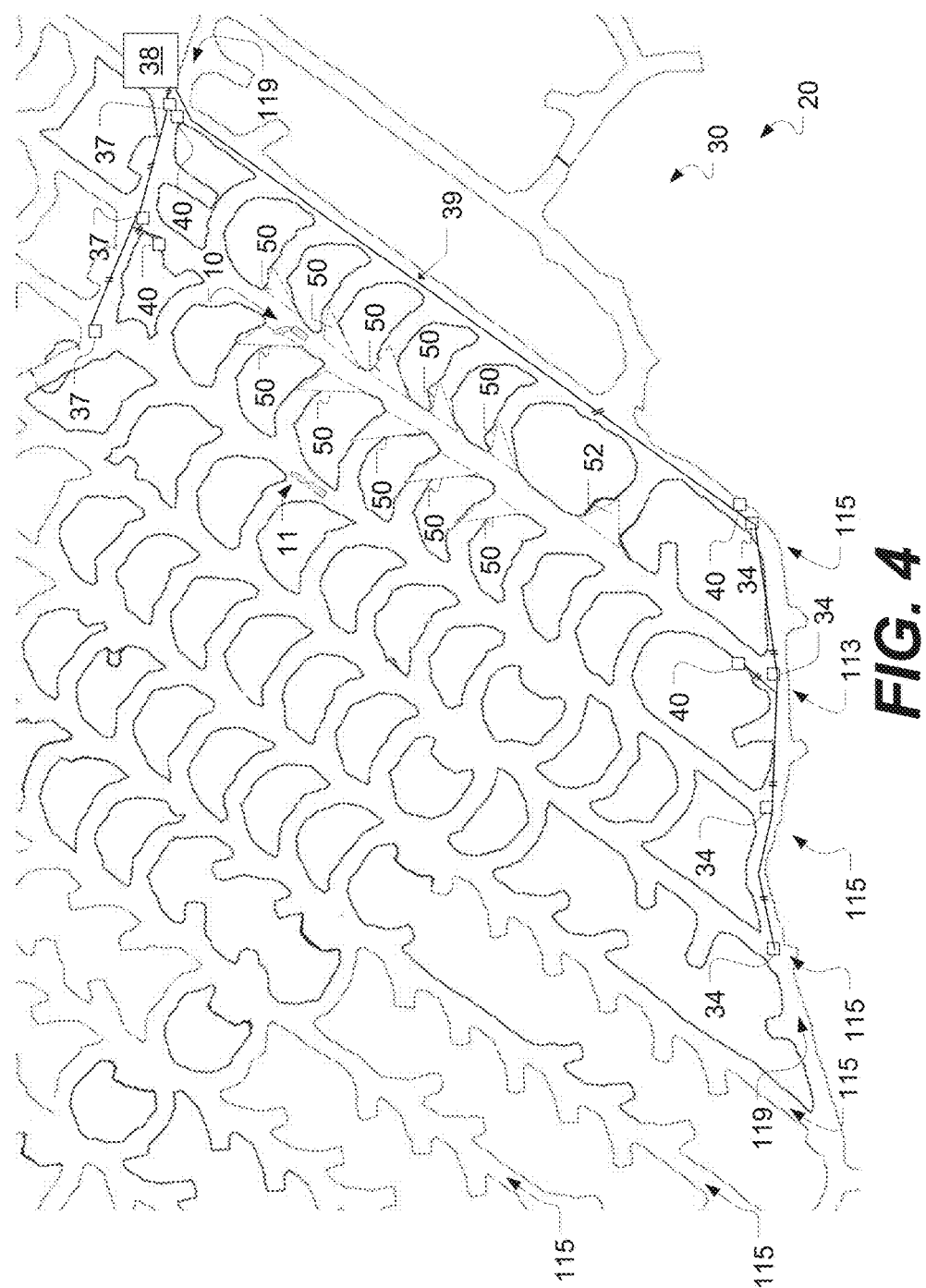
FIG. 4 is a pictorial illustration of a worksite in which the positioning system of FIG. 2 may operate.

For such situations, the positioning system 30 further includes a radio frequency communication system 33, as illustrated in FIGS. 2 and 4. The positioning system 30 determines an initial, first position, by the radio-frequency communication system 33. Once the initial position has been determined, the subsequent positions by comparing input data 102, derived from the subsequent position, with a reference dataset, wherein the reference dataset is dynamically derived based on a previously determined position. The previous position may, for example be, the most recently determined position. In other words, the initial position determined by the radio frequency communication system 33 is used to seed the positioning system 30 in its position tracking mode. In some embodiments, the determined initial position includes a coordinate, and optionally an orientation, with respect to a map of the mine, which may be the worksite map from which the reference data 109 is derived or may be some other map that is correlated with that worksite map. In other embodiments, the determined initial position is inferred by identifying a reference item 110 which, in turn, corresponds to such a coordinate and orientation. In other embodiments, the initial position is determined in the form of a set of reference items 110 within a specified area of proximity to the initial position.

The radio frequency communication system 33 includes one or more reference signal devices 34, 37 at respective known locations within the worksite 20, and a mobile signal device 36 that is located on the machine. In some embodiments, there may be two, three, or more of reference signal devices 34, 37. As shown in FIG. 2, a first of the reference signal devices 34 is at a corresponding known location 35 within the worksite 20. The first signal device 34 may be fixed to a side wall 24 or ceiling (not shown) of the worksite 20, such as a sidewall 24 or ceiling of the assigned tunnel 113 within which the machine 20 is assigned to operate. A second signal device 36 is located on the machine. In some embodiments, the second signal device 36 is fixed to the rear portion 27 of the machine 10. For example, in one embodiment, the second signal device 36 is located on top of cabin 28, while in another embodiment, the second signal device is located on top of the rear end 29 of the rear portion 27. A third signal device 37, being another of the reference signal devices 34, 37, is attached to the worksite at a different location to the first signal device 34. For example, the third signal device 37 may be fixed to a side wall 24 or ceiling (not shown) of the worksite 20, such as a sidewall 24 or ceiling of the assigned tunnel 113 within which the machine 20 is assigned to operate. The radio frequency communication system 33 is configured to perform a radio frequency communication between the mobile signal device 36 and at least one of the reference signal devices 34, 37.

The positioning system 30 includes a control system 38 in communication with the radio-frequency communication system 33 via at least one communication channel, with one or more of the mobile signal device 36 and reference signal devices 34, 37. In one embodiment, the communication channel is or includes a wired communication network 39, such as an Ethernet network, with the reference signal device(s) 34, 37. Alternatively, or additionally, a further communication channel allows the control system 38 to communicate by a wireless network, e.g. by at least one WiFi transceiver 40, with the radio-frequency communication system 33. Such a wireless communication can be used to communicate with the mobile signal device 36 in cases where at least part of the control system 38 is mounted in a fixed position with respect to the worksite (as in FIG. 2), or to communicate with one or more of the reference signal device 34, 37 in cases where the control system 38 is mounted entirely on the machine 10.

The control system 38 may include, or may be, the controller 18. In embodiments, in which the control system 38 is the controller 18, the memory system 21 may include additional data representative of a map information, which may be in addition to or complement the worksite map from which reference data 109 may be derived (also referred to herein as the Lidar map). In embodiments in which the control system 38 includes but is not the same as controller 18, control system 38 may include separate processing device(s), and a separate memory system, from the processing device(s) and memory system 21 of the controller 18. In such cases, the control system may store, outside of controller 18, data representative of a further map of the worksite 20, which may optionally include the Lidar map. The control system 38 obtains data relating to the radio frequency communication from the radio frequency communication system 33. In some embodiments, the obtained data defines a distance associated with a characteristic of the radio-frequency communication. For example, the characteristic may be a strength of the signal or an elapsed time between sending and receiving one or more communicated signals. Based on the obtained data relating to the radio frequency communication, the control system 38 determines position data that is indicative of the position of machine 10 within the worksite 20.

From the position data, the control system 38 selects a reference dataset associated with the position data. The reference dataset is a subset of reference items 110 represented by the worksite data 108 based on the position data. The control system 38 then identifies, from the reference dataset, a reference item 110 corresponding to the input data 102. Thereafter, as the input data 102 is updated from new positions in the worksite 20, the positioning system 30 tracks the position of the machine 10 by comparing the input data 102 with a reference dataset that is dynamically derived based on the most recently determined position.

The reference signal device or devices 34, 37 and the mobile signal device 36 may consist of the same hardware and software. However, in some embodiments, especially involving multiple reference signal devices 34, 37 and/or multiple mobile signal devices 36, each of the reference signal devices 34, 37 and mobile signal devices 36 has a respective device identifier associated therewith, such as unique MAC address. In other embodiments the hardware and/or software of the reference signal devices 34, 37 may be different to that of the mobile signal device(s) 36 by having further differences, in addition to the different device identifiers.

Exemplary embodiments for the radio-frequency communication 33, used by control system 38 to determine position, will now be described in further detail.

Position Determination Based on a Threshold Strength of a Radio-Frequency Signal In some embodiments, a first signal device 34, being one of the reference signal devices 34, 37, transmits a radio frequency signal that can be detected by a second signal device in the form of the mobile signal device 36, when the second signal device is within the transmission range of the first signal device 34. When the second signal 36 device is at a detection distance 42 from the first signal device 34 that transmitted the radio-frequency signal the second signal device 36 indicates to the controller 18 that the transmitted signal has been received. This indication occurs when the transmitted radio-frequency signal is greater than a threshold strength. In one embodiment, the threshold strength is a minimum signal strength (e.g. amplitude or power) at which the second signal device 36 is able to detect the transmitted signal. In another embodiment, the threshold strength is a minimum strength at which the second signal device measures the signal strength to be above some predetermined level. The communication system 33 is configured so that the detection distance 42 is predetermined to be proximal to the first signal device 34 so that the positioning system 30 can infer, based on the detection distance, an approximate position in the worksite 20 within which the second signal device 36 is located. Thus, the first and second signal devices 34, 36 act as a proximity sensing system.

The location 35 of the first signal device 34 is stored in a memory component of the positioning system 30, such as in the memory system 21 of the controller 18. The controller 18 receives the indication from the second signal device 36 that a signal has been received from the first signal device 34. Since the location 35 and detection distance 42 are also known, the indication from second signal device 34 that a signal has been received from the first signal device 34 constitutes position data from which the position of machine 10 may be inferred. For example, the positioning system may infer that the second signal device is at or within an area in the worksite defined by a circle 44 having a radius equal to the detection distance and being centered about the known location 35 of the first signal device 34. Based on this position data, the controller 18 determines first comparison data 128, exemplified herein as a first set of reference data. The first set of reference data consists of reference items 110 that are associated with the location 35. In one embodiment, the location 35 may be known in terms one or more reference items 110 that are associated with the location 35. The smaller the detection distance 42, the fewer the number of reference items the positioning system 30 will consider to be associated with location 35. If the detection distance 42 is smaller than the spacing of the positions corresponding to the reference items 110 in the worksite data, the positioning system 30 may determine a single reference item as being associated with the location 35.

The positioning system 30 may also include any number of further reference signal devices, such as reference signal device 37, distributed at different locations in the worksite 20. The respective locations of each of the further signal devices is known to the positioning system in the same manner as for the first signal device 34. Similarly, each of these further signal devices 37 operates interacts with the second signal device 36 in the same way the first signal device 34 interacts with the second signal device 36. As the machine 10 travels through worksite 20 in search for an initial position data to seed the positioning system 30, the initial position data will based on the known location of whichever of the reference signal devices 34, 37 the machine 10 first passes.

In embodiments involving multiple reference signal devices 34, 37, controller 18 determines which of the reference signal devices 34 or 37 has been detected by the second signal device 36, so as to determine the corresponding position in the worksite 20 associated with the detected reference signal device 34 or 37. In one embodiment, this is achieved by each of the reference signal devices 34, 47 encoding a unique identifier in their respective radio frequency transmissions. Such a unique identifier, may, for example be a MAC address or serial number of the reference signal device 34, 37. The second signal device or controller 18 may then use a look up table to determine the position or reference member(s) 110 associated with the detected reference signal device 34, 37. The reference member(s) 110 may be determined by identifying reference positions 134 within some predefined distance from the position associated with the detected signal device 34, 37. Based on the reference positions 134, the reference data 109 of the first set of reference data may then be derived from the map of the worksite 20.

In some embodiments, the direction of communication between the mobile signal device 36 and the reference signal devices 34, 37 is reversed. In such embodiments, the mobile signal device 36 transmits a radio frequency signal that can be detected by any one of the one ore more reference signal devices 34 or 37 when the reference signal device 34 or 37 is within the transmission range of the mobile signal device 36, such within a radial distance 48 from the mobile signal device. The transmission range may be sufficiently small, e.g. less than 3 meters, such that as the machine 10 passes a given reference signal device 34 or 37, the reference signal device 34 or 37 detects the transmitted signal from the second signal device, and sends a signal to the control system 38 indicating that the signal has been received. In embodiments in which there are multiple reference signal devices, the reference signal device 34 or 37 also identifies itself to the control system 38, so that the control system 38 can determine the location at which the signal was detected. Based on the determined location the control system 38 determines one or more reference items 110 corresponding the determined location. The one or more reference items may be determined either directly from identification of the reference signal device 34 or 37, or via identification of a coordinate or other position parameter defining the position of the identified reference signal device 34 or 37.

In one embodiment, the reference signal device(s) 34, 37 are passive RFID tags and the mobile signal device 36 is an RFID reader. The mobile device 36 transmits a radio-frequency signal which is interfered with by a reference signal device 34 or 37 when the reference signal device is in proximity to the mobile signal device. From the interference, the mobile signal device identifies the reference signal device 34 or 37 that interfered with the signal. Alternatively, the RFID tags can be active (powered) tags which receive the radio-frequency signal from the mobile device, and transmit a response signal to the mobile device identifying the corresponding reference signal device 34 or 37 that transmitted the response signal. In either case, the positioning system 30, can thereby determine that the position of the machine 10 is proximate the identified reference signal device 34 or 37.

In another embodiment the reference signal device(s) 34, 37 are RFID readers and the mobile signal 36 device is a passive RFID tag. Each reference signal device 34, 37 transmits a radio-frequency signal which is interfered with by the mobile signal device 34 or 37 when the mobile signal device 36 is in proximity to the reference signal device 34 or 37. From the interference, the reference signal device 34 or 37 identifies that the mobile signal device 36 interfered with the signal. Alternatively, the RFID tags can be active (powered) tags which receive the radio-frequency signal from the reference signal device 34 or 37, and transmit a response signal to the reference signal device 34 or 37, identifying the mobile device 36 in the response signal. In either case, the positioning system 30, can thereby determine that the position of the machine 10 is proximate the reference signal device 34 or 37 that identified the mobile signal device 36.

Position Determination Based on a Measured Strength of a Radio-Frequency Signal

In some embodiments, rather than determining the detection distance based on a threshold level of the transmitted signal, the signal device (either 36, or 34 or 37) that receives the radio-frequency transmission from the transmitting signal device (the other of 36, or 34 or 37) measures the signal strength of detected signal. That is measurement is of a received signal strength indicator (RSSI), such a power. In one embodiment, the position of the machine 10 that is associated with the signal transmission may then determined as described above, but based on a variable detection distance 42. In other words, content of the first comparison data 128 depends on the determined detection distance 42. Specifically, the control system 38 determines a position in the worksite 20 associated with the reference signal device 36, 37 that was involved with the signal transmission. The positioning system 30 then determines reference positions 134 for generating the first comparison data as being those positions in the worksite 20 at which, based on the determined detection distance 42, the machine 10 may potentially be located. For example, as in the embodiments, described above, the potential positions may be determined to be all positions within a radial distance from the position of the reference signal device 34 or 37 involved with the signal transmission.

In another embodiment, multiple reference signal devices 34, 37 are simultaneously in communication with the mobile signal device 36. Based on the signal strengths of the respective communications, the positioning system 30 can determine, for a given position of the machine 10 in the worksite 20, distances to the respective multiple reference signal devices 34, 37. The respective distances are used by one of the control system 38 to determine position by a trilateration process. In the trilateration process, the possible position(s) of the mobile signal device is limited to the locations of intersection 47, 49 of the notional circles 44, 46 respectively centered the two or more reference signal devices 34, 37 and having respective radii equal the corresponding determined radial distances. It is appreciated that in the case of two reference signal devices, the trilateration process may be referred to as "bilateration". However as used herein "trilateration" is intended refer to determining location based on the intersection between two or more circles.

For embodiments in which the initial position of the mobile signal device 36 is determined to be at (as opposed to within) a radial distance(s) from one or more reference devices 34, 37, the position of the mobile device 36 may be more precisely determined using any one or more of: (i) map information to limit the location to a tunnel 113 in which the mobile device 36 is known to reside (e.g. location 47 in tunnel 113, as opposed to location 49 in tunnel 115), (ii) movement information from a motion sensor 14, (iii) a statistical model; each of which are described in more detail, below, for embodiments based on elapsed time measurements. These methods for more precisely determining location from one or more radial distances are described in further detail below, applied to other embodiments of the invention.

Position Determination Based on a Time-Based Characteristic Associated with the Radio-Frequency Communication In some embodiments, a radial distance to at least one reference signal device 34, 37 is determined from a time-characteristic associated with the radio frequency communication. For example, the time characteristic may be associated with an elapsed time between a transmission of the radio frequency communication and a reception of the radio frequency communication. In one embodiment, the elapsed time is the difference between a time at which a radio-frequency signal is transmitted, in one direction, from one of (i) a reference signal device 34 or 37 or (ii) the mobile signal device 36, and received from the other of the reference signal device 34, 37 or the mobile signal device 36. The transmitted signal includes a time stamp at which the signal was transmitted. The receiving device can therefore determine the time taken for the signal to travel from the transmitter to the receiver. Since the speed of travel is known (i.e. the speed of light), the radial distance can be determined. However, the internal clock (to which time is measured) on the transmitting device will drift with time with respect to the internal clock on the receiving device. This limits the accuracy with which the travel time, and hence distance and position, can be determined. Therefore, in one embodiment, the a wireless synchronization protocol is employed to maintain some synchronicity between the internal clocks.

In some embodiments, rather than determining an elapsed time, communication system 33 or control system 38 determines the position of the machine based on a time-difference of arrival. The time-difference refers to a difference in arrival times for respective signal transmissions between the mobile signal device 36 and a plurality of reference signal devices 34, 37. For example a signal may be broadcasted from the mobile signal device 36, and the times of reception (i.e. arrival) at each of the reference signal devices 34, 37 may be recorded to derive one or more time-difference measurements. Conversely, each of the reference signal devices 34, 37 may simultaneously transmit respective signals, and the arrival time of each of the signals is recorded at the mobile signal device 36. The reference signal devices 34, 37 may be synchronized with each other so that the time difference calculation removes any asynchronicity between the mobile signal device 36 and the reference signal devices 34, 37. Based on the difference in arrival times, the position of the second signal device 36 may be derived.

In other embodiments, the time-characteristic is an elapsed time that relates to a round-trip for a two-way radio frequency communication. An initiating, first radio-frequency signal is transmitted from an initiating device to a responding receiving device. Upon receiving the first signal, the responding device sends a response radio-frequency signal to the initiating device. In one embodiment, the first signal may include identification data that identifies the initiating device that transmitted the first signal. The response signal may also include the identification data identifying the initiating device. Thus, when the initiating device receives the response signal it can determine that the response signal was a response to the first signal sent by that initiating device, as opposed to some other possible initiating devices in the worksite. The responding device may also include in the response signal identification data that identifies the responding device. Thus, in embodiments having multiple responding devices in the worksite 10, the initiating device can determine which responding device responded to its initiating signal. From this information, the elapsed time is the time taken for the first signal to propagate from the initiating device to the responding device plus the time taken for the response signal to propagate from the responding device to the initiating device. Processing delays by the initiating device and responding device are constant and may be subtracted or otherwise factored out of any time measurements, and the error due to any clock asynchronicity is eliminated from the elapsed time calculation, since both the transmission time and the reception time are referenced to the same internal clock (i.e. the clock of the initiating device). The elapsed time may thus represent two-way time of flight of the radio-frequency communication. The radial distance(s) to the corresponding reference signal device(s) 34, 37 involved in the radio-frequency communication(s) can be determined as being half of the time-of-flight multiplied by the speed of light.

In one embodiment, the signal transmission involves directional transmission, as opposed to omnidirectoinal transmission, so that the radial distance corresponds to a specific location in the worksite, as opposed being any point on a circle defined by the radius.

In another embodiment, the specific location along the circle 44 or 46 at which the machine 10 is located may be determined by knowledge of the worksite topology. For example, based on a worksite map stored in memory, the control system 38 may exclude locations along the circle 44 or 46 which are not possible locations for the machine 10. Such excluded locations may be for example locations within a wall of the worksite. Additionally or alternatively, as described above, the control system 38 can limit the possible locations to those locations on the circle 44 or 46 which are within a tunnel 113 in which the machine 10 is known to be located, e.g. because it has been assigned to operate in that tunnel.

In addition or as an alternative to using knowledge of the worksite topology, the position determination may be involve on a process of trilateration as has already been described herein, but in which the radii for the respective circles 44, 46 centered about reference signal devices 34, 37 are based on the corresponding elapsed times, such as two-way time-of-flight determinations.

In some embodiments, in addition or instead of using the worksite topology information and/or a trilateration process, the accuracy of the position determination may be improved based on a statistical model, such as a Kalman filter. A Kalman filter determines position using an iterative process. Specifically, a Kalman filter determines the most likely position at a time, t, by using knowledge of one or more past position determinations to weight, based on a likelihood of being correct, all possible positions at time, t. The possible positions, may be identified by the one or more radial distances to respective one or more reference signal devices 34, 37. For example, the statistical model may know the position (or a possible positions) at time t−1, and know the maximum speed of machine 10, or a measured change of speed of machine 10. Based on this knowledge, the statistical model can weight, and then rank, the possible positions at time t based on their distance and/or directional disposition with respect to the previous position or possible positions at t−1. For example, those possible positions at time t which are a further than a first distance from the position or possible positions at time t−1 may be ranked much lower than those possible positions at time t which are closer than a second distance from the position or possible positions at time t−1.

In addition to or instead of using a Kalman filter to improve overall position determination as the machine 10 moves in the worksite, a Kalman filter may also be used to improve the accuracy each of the distance measurement used in the position determination. For example, communication system 33 may measure time-of-flight a number of times, by repetitively transmitting round trip communications while the machine 10 is at essentially the same position in the worksite. This may be beneficial in the underground environments due to a level of noise that may result from multi-path reflections or from low a low-signal to-noise ratio. A Kalman filter may in this case be used to improve the distance measurement by disregarding or giving low weighting to measurements that are statistical outliers, and giving higher weighting to measurements which are statistically consistent with previous measurements. Thus, in one embodiment, a first Kalman filter may be used to in determining the time-of-flight or distance associated therewith, and second Kalman filter may be used to determine position within the worksite.

In some embodiments, in addition to or instead of using the worksite topology information and/or a trilateration process, the position determination is based on movement information from one or more motion sensors 14, and/or orientation information from an orientation sensor 16 and/or 17. In one embodiment, a velocity vector or speed is determined from the motion sensor(s) 14. For example, one motion sensor 14 may be an odometer, from which a speed is derived. A velocity vector may be derived based on the speed and orientation information, such as may be provided by a digital compass 16. Since for the described LHD loader, the digital compass 16 provides the orientation of the front portion 23 of the machine 10 only, the rear portion 27 of the machine 10 may be derived based on the determined orientation of the front portion 23 and the articulation sensor 17, measuring the rotation of the rear portion 27 with respect the front portion 23. The velocity vector or speed can then be used to predict a future position or future set of positions based on a previously determined position or set of possible positions derived from a previous radio-frequency communication (e.g. an elapsed time). The set of predicted positions can then be narrowed based on their correlation with a new set of possible positions derived from an updated radio-frequency communication. The parameters in the narrowed set of positions is then updated to new predicted values based on the velocity or speed. This process can repeated iteratively until only a single predicted position remains, or until the set of positions is narrowed enough to represent acceptable level of positional accuracy.

The determination of position based on the motion sensors may include a position simulation based on statistical model such as a particle filter. Such a particle filter simulation may include populating a stored map of worksite 20 with one or more virtual particles. Each particle represents a different possible machine position and/or orientation. For example, the position may be represented by an x-coordinate associated with an x-axis and a y-coordinate associated a y-axis. Orientation of each particle may be represented by degrees of rotation relative to, for example, the positive x-axis, or a two-dimensional unit vector characterized by an x- and y-value. During such a simulation, position system 30 randomly populates a map stored in the storage module of control system 38 (e.g. in the memory system 21 of controller 18) with particles. Each particle has an initial randomly generated position and orientation. The respective positions and/or orientations of the particles are then iteratively updated based on information from position data derived from the elapsed time measurements to respective reference signal devices 34, 37, until positioning system 30 is able to determine an accurate position of machine 10 indicated by a spatial convergence of the updated particles.

For any of the above embodiments based on a time-based characteristic, the initiating device(s) and the responding device(s) are Radio-Frequency Ranging (RFR) devices. In one embodiment, the initiating device(s) are respective active (as opposed to passive) RFID tags and the responding device(s) may be respective RFID readers. Alternatively, the initiating device(s) may be respective RFID readers and the responding devices may be respective active RFID tags. However, as a further alternative, the initiating devices and receiving devices are Radio Frequency Ranging (RFR) comprised of the same hardware configuration, but which may be selectively commanded by control system 38 to initiate the radio-frequency from selected RFR device to any one or more other RFR devices in the RFR system.

The accuracy of the position determination may be improved in a number of ways. In one embodiment, the RFR devices are ultra-wideband (UWB) radio-frequency devices configured to determine a distance between respective devices based on an UWB radio-frequency communication. In some embodiments, the communicated UWB radio-frequency signals have a bandwidth in the order of gigahertz. For example, in one embodiment, the frequencies may range from 3.1 to 5.3 GHz, with a centre frequency of 4.3 GHz, thus providing a bandwidth of approximately 2 GHz. The radio frequency signal transmission may be comprised of a train of pulse waveforms. The pulsed waveforms are short impulses having frequency components that are, in some embodiments, spread over two or more gigahertz. In one embodiment, the spread of frequencies has a centre frequency of around 4 GHz, e.g. 4.3 GHz. The calculation relating time-of-flight to distance of travel of the radio frequency transmission assumes that the path of transmission is along a straight line. However, in underground mine sites, radio-frequency transmissions are reflected by the rock bed that forms the walls of the mine tunnels, so the transmission has multiple paths between the transmitter and receiver. The multiple paths result in the signal being received at a multitude of different times, making it difficult to determine the time of the direct, straight path. However, the direct path will arrive first, so can be determined from the leading edge of the received signal, i.e. the first received pulse. The use of UWB radio-frequencies can improve the resolution of the measurement due to high bandwidth, high frequency composition of the waveform, or put conversely, due to the short wavelength of the signal. In one embodiment, to enable the direct path of transmission to reach the receiver, and be received at an adequate signal strength to accurately detected, the transmitting and receiving RFR devices are arranged in line-of-sight of each other.

In some embodiments, including but not limited to UWB embodiments, the radio-frequency signal is transmitted and processed for the coherent signal processing. The coherent signal processing involves repetitively transmitting the radio frequency signal in a coherent manner so that same bits of data transmitted via the communication repetitively transmitted over multiple transmissions. This allows the amplitude of the signal transmission to be lower for a given signal-to-noise ratio. The reduced amplitude and hence, power, of the transmission may in some instances be of assistance in ensuring that the radio-frequency communication in within any maximum allowable electromagnetic emission level. This may assist the positioning system 30 in meeting any regulatory electromagnetic compatibility (EMC) standards which may be required. Additionally or alternatively, the low signal-to-noise ratio can be used to increase, for the same power level, the maximum distance over which the ranging devices may communicate. Accordingly, in some embodiments, the mobile signal device 36 and the reference signal devices 34, 37 determine a time-of-flight measurement using coherent signal processing. Further, in some embodiments, the coherent signal processing is achieved using UWB radio-frequency ranging devices as the respective signal devices 34, 36, 37, and the time of flight measurement is a two-way (round-trip) time-of-flight measurement. In one embodiment, the UWB coherent processing radio-frequency ranging devices are PulsON® 410 (P410) ranging radio devices manufactured by TimeDomain® (TDC Acquisition Holdings, Inc.). In another embodiment, the UWB coherent processing radio-frequency ranging devices are P412 ranging radio devices, and in a further embodiment, the UWB coherent processing radio-frequency ranging devices are P442 ranging radio devices, also manufactured by TimeDomain®.

In an exemplary embodiment of a two-way time of flight measurement involving coherent processing, a data packet may be transmitted multiple times, at regular intervals (i.e. a known duty cycle), in a first signal from the initiating device to the responding device. The data packet includes a time stamp indicating the first time that the data is transmitted and an identifier that identifies the initiating device (e.g. the initiating device's MAC address). The responding device receives the transmission, and identifies the time at which the signal is first arrived at the responding device. The responding device knows the duty cycle at which the data packets are transmitted. Thus the responding device can correlate the packets to integrate corresponding bits within each packet and thereby improve the signal-to-noise ratio. The responding device then determines a one-way time of flight based on the time stamp and the recorded time of arrival. The responding device then sends a response signal to the initiating device using the same repetitive transmission method, but encoding in the response data packets the time of transmitting the response signal, the calculated one-way time-of-flight, the identifier of the initiating device and an identifier associated with the responding device (e.g. the responding device's MAC address). The initiating device then receives the response signal and correlates the data from each data packet to improve the signal to noise ratio. The initiating device records the time of first receiving the response signal, and determines the time-of flight for the response signal. The two-way time-of-flight is then derived by the initiating device by summing the time-of-flight of the first signal and the time-of-flight of the response signal.

INDUSTRIAL APPLICATION

FIG. 4 illustrates an arrangement of positioning system 30 in worksite 20 of a mine having a plurality of tunnels parallel 113, 115. At a first end of each of the tunnels 113, 115 are respective first signal devices 34, being reference signal devices as described herein. Machine 10, having a mobile, second signal device 36, is assigned to operate a tunnel 113 and portions of the worksite branching therefrom, such as designated loading locations 50 (e.g. drawpoints) for loading ore, and at least one designated dumping location 52 (e.g. an ore pass) for dumping ore. Another machine 11 operates in another tunnel 115 of the mine, although, optionally but not shown, the other machine 11 may operate in the same tunnel 113 as machine 10. Machine 11 may have the same components as machine 10, and like machine 10, and may also be an LHD loader. Machine 11 has a corresponding mobile, second device 36 being uniquely identifiable from the mobile device 36 on machine 10 to due to each of the mobile devices 36 having a different serial number, MAC address or some other unique identifier by which the mobile device 36 may be uniquely identified. At a second end of the tunnels 113, 115, opposite the first end, are respective third signal devices 37, being reference signal devices as described herein.

Each of the reference signal devices 34, 37 have a field of operation, within the tunnel, over which the reference signal devices 34, 37 have a line of sight. The field of operation passes at least two of the designated loading locations 50. In the embodiment of FIG. 4, the field of operation extends at least half way down the corresponding tunnel 113, 115, and optionally, the entire length of the tunnel 113, 115. Each of the reference signal devices 34, 37 are positioned at intersections of the corresponding tunnel 113 or 115 and a crossroad 119 connecting the respective tunnels 113, 115, so the field of operation also includes part of a cross road 119. In this way, the reference signal devices 34, 37 so that mobile machines 10 and 11 are always within a line of sight to at least one, and in one embodiment two, reference signal devices 34, 37. In one embodiment, the reference signal devices 34, 37 are positioned on longitudinal centerlines of their corresponding tunnel. Since the tunnels 113, 115 are relatively narrow, the signal device 36 will be generally collinear with the signal devices 34, 37 at either end of the tunnel. This reduces the position determination to a determination in 1-dimensional space, thus enabling accurate longitudinal position determination by bi-lateration.

Ethernet network 39 connects the control system 38 to each of the reference signal devices 34, 37, and also to wireless network transceivers 40, in the form of Wi-Fi transceivers, located proximal to a corresponding reference signal device 34, 37. The wireless network transceivers 40 are optionally located at the intersection of the corresponding tunnel 113, 115 and crossroad 119. However, in the embodiment illustrated in FIG. 4, the wireless transceivers 40 are located adjacent the intersection, just inside the corresponding tunnel 113 or 115, and have a line of sight meeting the same criteria as for the reference signal devices, so that the mobile signal devices 36 are always within line-of-sight of at least one wireless transceiver 40. The Ethernet network 39 includes an Ethernet switch (not shown) at or next to each of the reference signal devices so that the reference signal devices, and optionally the WiFi transceivers, are connected in a daisy chain topology. In one embodiment, each Ethernet switch is included in a corresponding reference signal devices 34, 37. The Wi-Fi transceivers may be used to send and/or receive operational data to and/or from a Wi-Fi transceivers (not shown) on the respective mobile machines 10, 11. The operational data may for example include information which may be read or entered by an operator of the mobile machine via a userinterface module (not shown) in communication with the Wi-Fi transceiver on the mobile machine 10, 11.

The respective positions of the machines 10, 11 in the worksite 20 may be determined based on radio-frequency communication in accordance to any method and on any system described herein. However, in one embodiment, particularly suited to the arrangement of positioning system 30 in FIG. 4, reference signal devices 34, 37 are UWB radio-frequency ranging devices having features and operation as has been previously described. For the arrangement in FIG. 4, the positioning system 30 may position the machines 10, 11 with sufficient accuracy such that, in some applications, further positioning based on Lidar input data 102 is not required. For such applications, the position system 30 need not include Lidar unit 32. Rather, the position of the machine 10, 11 may be tracked by iteratively positioning the machine 10, 11 based on radio-frequency communication, as described. Further, in such embodiments, rather than or in addition to tracking machines 10, 11, the positioning system and method may be used to track any other object to which a mobile signal device 36 is attached. For such embodiments, the first ranging device 34 is at a known location in the mine and having a field of operation, within the tunnel 113, over which the first ranging device 34 has a line of sight. The field of operation extends along the tunnel 113 passed at least two of the designated loading locations. The second ranging device 36 is associated with the machine or other mobile object and located in the field of operation. The line of sight extending passed at least two of the designated loading locations may enable the positioning system to accurate determine position along the tunnel, with a resolution sufficient to determine at which of the two designated locations, or position therebetween, the machine or object is located. Further in one such embodiment, the positioning is based on two-way time of flight, as has been described herein.

However, for embodiments described hereinafter, once the positioning system 30 determines position data based on the radio frequency communication, the positioning system 30 uses this position data to track the machine 10 and/or machine 11, based on input data 102 from the respectively Lidar units 32 on each of the machines 10, 11. Such embodiments described hereinafter include (but are not limited) all embodiments in which the reference signal devices 34, 37 are UWB radio-frequency ranging devices.

Figure 5:
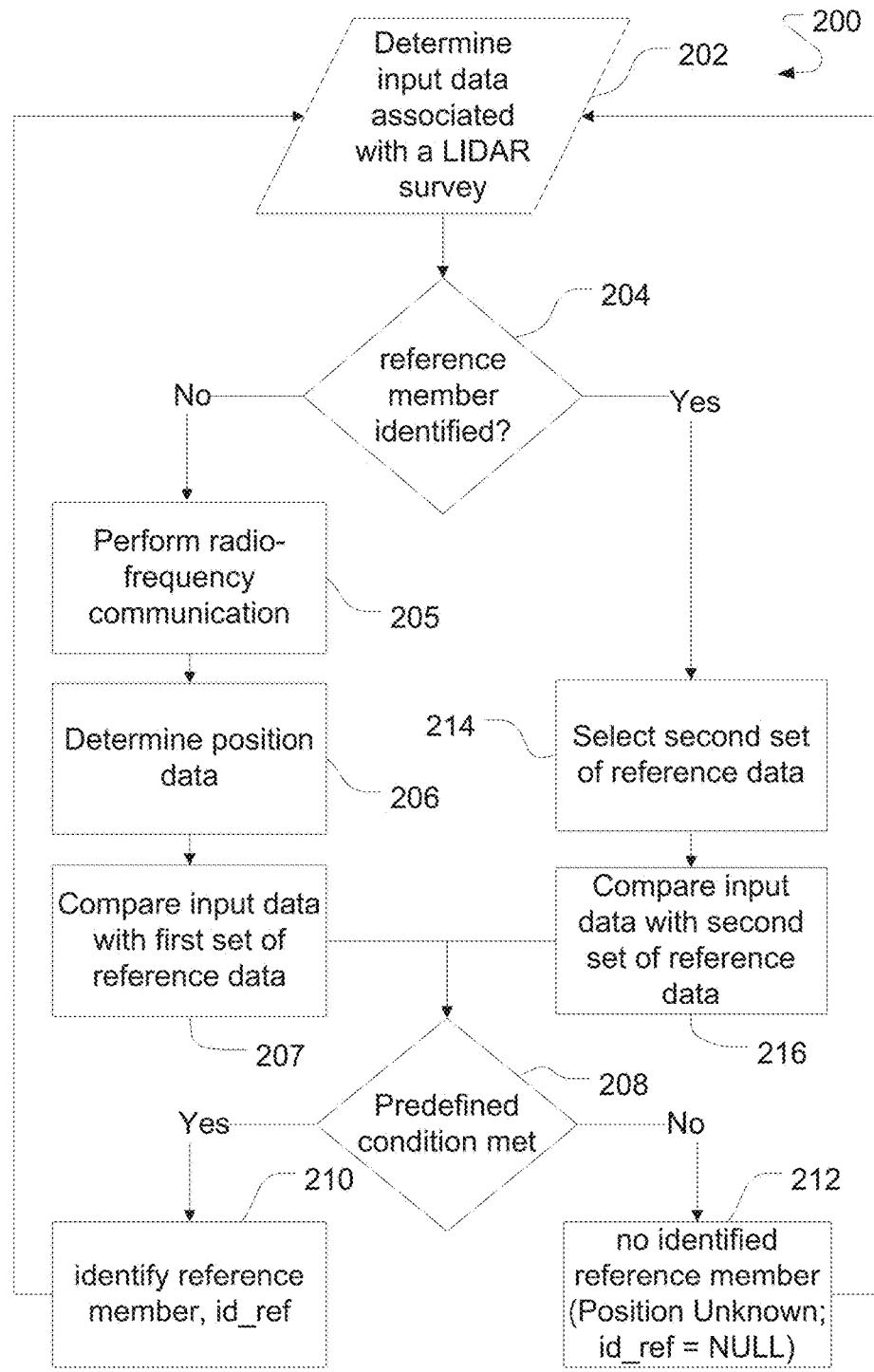
FIG. 5 is a flowchart depicting an exemplary disclosed positioning method.

FIG. 5 illustrates a position determination process 200 performed by control system 38 to determine an initial, first position of the machine, and subsequent positions thereafter. The first position is used to seed a position system 30 to assist the positioning system 30 when the position is entirely unknown, or when the positioning system 30 loses track of the machine's position. According to process 200, a parameter id_ref stores a most recently identified reference item 110. However, when the positioning system 30 is initialized id_ref is set to NULL since no reference item 110 has yet been identified. At step 202, positioning system 30 determines input data 102 associated with a Lidar survey from the current position of the machine. Since, no reference item has been identified, step 204 directs the process to determine an initial position for seeding the positioning system 30.

To determine the initial position, at step 205, controller 38 commands the radio frequency communication system 33 to perform one or more radio frequency communications. For example, in one embodiment, the command is given to one or more of the reference signal devices 34, 37 to each communicate with the mobile signal device 36. Based on the radio-frequency communication, control system 38 determines, at step 206, position data, such as a position of machine 10 with respect to the worksite 20. The positioning data is indicative of a position of the machine 10 during the radio frequency communication. The position data may be indicative of location and, optionally, orientation of the machine 10. The position data may be an identified reference item (such as reference item 110) or items having an associated position in the worksite 20 that corresponds, accurately or approximately, to the position of the machine 10. Alternatively, the position data may be a coordinate and/or some other positional reference that identifies the position of machine 10, accurately or approximately, with respect to a geographic frame of reference.

At step 207, control system 38 compares the input data 102 with a first set of reference data. The first set of reference data consists of reference items 110 that are associated with the position data. The first set of reference data is determined by control system 38 represent a subset of the worksite data 108. In some embodiments, the subset determined to include only reference items 110 which have a corresponding position within some defined proximity to the position in the worksite that either corresponds with or is defined by the position data. For example, in one embodiment, the first set of reference items 110 is limited to only those reference items 110 determined to correspond with positions within a some defined radius, such as a 10 meter radius, of the position or positions associated with the position data. In other embodiments, the defined proximity may be an area that is asymmetric with respect to the position in the worksite corresponding to the position data. For example, based on knowledge about the machine's direction of motion, the controller 38 may limit the first set of reference data to include only those reference 110 on one side of the position corresponding to the position data. This may be the case, for example, in situations where the position data identifies the position relatively accurately, including situations where the accuracy is sufficient to identify a specific one or only a few reference items 110 that corresponds the position data, or where the position data consists of an identified reference item 110. In some embodiments, the subset determined to include all reference items 110 corresponding to positions in the worksite within the an area of the worksite defined by the position data. The may be the case, for example, where the position data only approximately identifies the position of the machine 10.

At step 208, if the comparison of the input data 102 with the first set of reference data meets a predefined condition, then the process proceeds to step 210 by identifying a reference item 110 that matches the input data 102. The predefined condition is that at least one reference item 110 is determined to match the input data 102. The reference item 110 that is best correlated with the input data 102 (or the reference identifier 118 or reference position 134 associated with that reference item 110) is saved into position identifier parameter, id_ref, 132. The positioning system 30 thus knows that the machine 10 is at the identified reference position 134. When the machine moves to a new position, or at some incremental time later, the input data 102 is updated from a new Lidar survey. The process 200 returns to step 202 to determine the new input data 102. At step 204, the positioning system then reconsiders whether a reference item has been identified (i.e. whether a position has been determined).

Once a reference item has been identified step 204 directs the process 200 to compare the input data with second comparison data 130 that is different to the first comparison data 128. The second comparison data 130 is exemplified herein as a second set of reference data, intended for tracking the position from the position corresponding to the previously identified reference item 110, stored in id_ref. At step 214, the composition of the second set of reference data is selected. This is achieved by selecting reference positions 134 that have a proximal relationship to the reference position 134 of the reference item identified in step 204. Each of the reference data 109 may be derived and collectively stored to form a complete second set of reference data that is then compared with the input data. Alternatively, each reference data 109 associated with the second set may be generated, compared with the input data, and then erased, before the next reference data 109 in the second dataset is generated, compared and erased. Therefore, the determination and generation of the second set of reference data may occur concurrently with the comparison of the second set of reference data the input data 102. In any case, the second set of reference data represents a subset of the worksite data 108. The subset is determined based on the most recently identified reference item, which is identified by id_ref. More specifically, the subset is only includes reference items 110 which have a corresponding position within some predefined proximity to the position of the most recently identified reference item, id_ref. For example, in one embodiment, the second set of reference items 110 is limited to only those reference items determined to correspond with positions within a 10 meter radius of the position corresponding to identified reference item, id_ref. In other embodiments, the defined proximity may be an area that is asymmetric with respect to the position in the worksite corresponding to the identified reference item, id_ref. For example, based on knowledge about the machine's direction of motion, the controller 38 may limit the first set of reference data to include only those reference 110 on one side of the position corresponding to the identified reference item, id_ref. At step 216, the updated input data 102 is compared with the second set of reference data to identify a reference item 110 matching the updated input data.

At step 208, the comparison of the input data 102 with the first or second set of reference data, whichever may be the case, may fail to meet the predefined condition. Such a situation occurs if there is no reference item in the reference dataset that matches the input data 102. In this case, id_ref is set to NULL. Thus, in the next iteration of the process 200, the positioning system again proceeds to step 205 to perform another radio-frequency communication to re-seed or to re-attempt the initial seeding of the positioning system 30. Reseeding is required in the event that the positioning system loses track of the machine's position. A re-attempt for the initial seeding is required if no initial position was determined, as may be the case if the previous input data was not representative of the worksite, which may occur if a moving or temporarily positioned object is captured in the Lidar scan that generates the input data 102.

Figure 6:
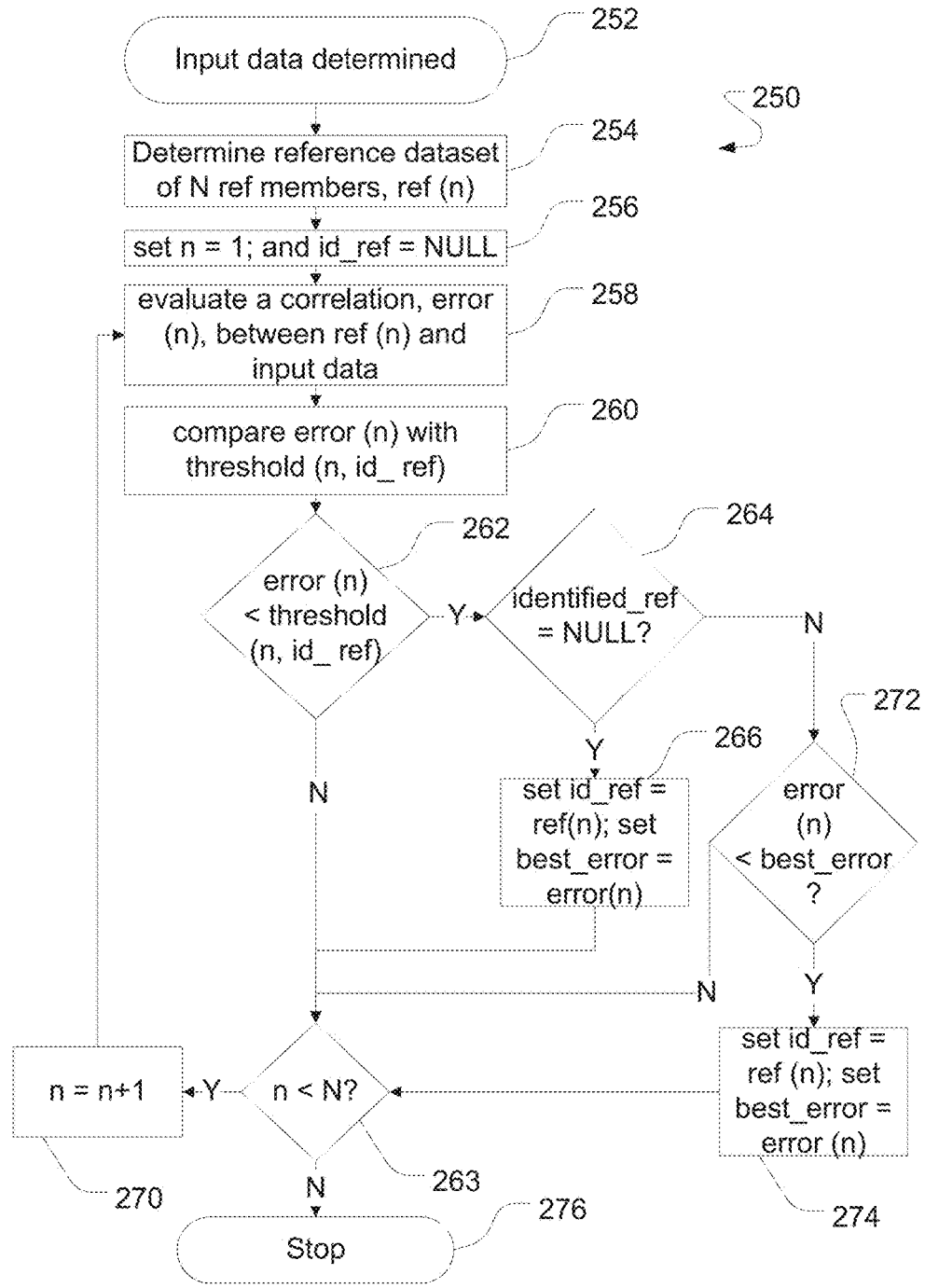
FIG. 6 is a flowchart depicting an exemplary correlation algorithm used to perform part of the positioning method of FIG. 5.

Correlating the input data 102 with the reference dataset (e.g. the first or second comparison data) and identifying a match may be performed using any number of shape-matching or pattern-matching algorithms, image recognition software, and other methods known in the art. As an exemplary embodiment, FIG. 6 illustrates an algorithm 250, performed by controller 18, for comparing the input data 102 with a reference dataset, consisting of or corresponding to N reference items, ref(n). The comparison determines whether or not the input data matches a reference item 110 associated with the reference dataset. If more than one reference item 110 matches the input data 102, the controller identifies the best, closest match. The algorithm 250 begins at 252 when new input data is determined. A reference dataset is determined at 254 to consist of first comparison data 128 or second comparison data 130, defining specific reference positions 134 and thereby specific reference items 110 to be represented by the reference dataset, as described for process 200. At step 256 the algorithm 250 is initialized by setting index n to 1 to index the first reference item, ref(1) in the reference dataset. Also, position identifier id_ref is set to NULL to indicate that no matching reference item 110 has yet been identified for the new input data 102. Next, the reference data 109 is generated to be represent data indicative of a Lidar scan from the reference position 134 associated with that reference item 110, and a correlation between the input data 102 and the reference data 109 of the indexed referenced member 110 is evaluated at step 258. In one embodiment, the evaluation is performed directly on the distance data, rather than on a characterizing feature extracted from the distance data. That is, the input data consists of measured distance values 104 and each reference data 109 consists of reference distance values 111. The evaluation, involves calculating an error that represents a difference between the input data 102 and the reference data 109 of the indexed reference item 110. The absolute differences between corresponding elements of the input data 102 and reference data 109 datasets are summed to determine the error(n) for the indexed, nth reference item 110 in the reference dataset. This may be calculated according to the following equation.

$$\text{error}(n) = \sum_{i=1}^{S} |D(i) - d_n(i)|$$

where:
n is the nth reference item in the reference dataset;
error(n) is the error of the nth reference reitem, compared with the input data;
D(i) is the input data;
$d_n(i)$ is the reference data for the nth reference item;
i is the ith distance value in each of the input data and the reference data; and
S is the number of distance values in the each of the input data the reference data.

However, in some embodiments the input data and reference data may include a great range of distance values. For example in embodiments were the Lidar unit 32 has a 360 degree field of view, some of the distance values may be in the order of one or two meters, corresponding to an adjacent wall 24 of the tunnel, while other distance values may be in the order of 100 meters corresponding to a longitudinal end of the tunnel 113. For such situations the error in the calculation in the above equation may exclude values of D(i) minus $d_n(i)$ that outside of a predetermined range, e.g. 0 to 5 meters. Additionally, or alternatively the distance values in D(i) and $d_n(i)$ may be limited to those values corresponding to angles within a predefined spread from a reference direction.

Next, at step 260, the evaluated correlation, error(n), is compared with a threshold. The threshold is denoted in FIG. 6 as threshold (n, id_ref) because the threshold can vary depending on each reference item 110 in the reference dataset (e.g. depending in the reference identifier 118 indexed by index n). For example, different thresholds may be selected for respective reference items depending on the distinctiveness of the reference item. Additionally or alternatively, the threshold can vary depending on whether a reference item 110 has previously been identified. For example, a first threshold may be selected if the positioning system 110 is in a position seeding mode (i.e. id_ref is NULL), and a second threshold may be selected if the positioning system 30 is in a position tracking mode (i.e. id_ref is not NULL).

Additionally or alternatively, different weighting factors may be applied to the error calculations for respective reference items depending on the index n and/or id_ref. The various weighting factor(s) and/or thresholds are determined during installation of positioning system 30. In one embodiment, the threshold and the weighting factor is constant.

The test for comparing the error with the threshold is illustrated at step 262. Specifically, if the error is less than the threshold, the reference item 110 is determined to be correlated and is considered to be a match. Otherwise the reference item 110 is determined not to be a match. If the reference item 110 is not a match, the controller 18 proceeds to step 263 by checking whether there are more reference items 110 in the reference dataset. If there are more members (i.e. n is less than N), the index n is incremented to n+1 to index the reference position 134 of the next reference item 110 in the reference dataset. In some embodiments the next reference item is calculated dynamically by determined calculating a coordinate some predefined distance and direction from the previously indexed reference position. In either case, the reference data 109 for that next reference item 110 is then generated from the worksite map (if the reference data 109 is not stored in memory system 21), and the evaluation 258 and comparison 260 is subsequently repeated for that reference data 109. If at step 262, the error is less than the threshold, the correlation is determined to be a match, directing the controller 18 to execute step 264. At step 264, the controller 18 checks whether a previous match has been found. If no match has yet been found (i.e. id_ref=NULL), the indexed reference item is identified as being the best match yet identified. The controller 18 then saves the indexed reference item is or the index n to id_ref at step 266, and saves the error(n) to a register, best_error. The controller 18 then checks at step 263 whether there are more reference items 110 in the reference dataset by checking whether n is less than N. In one embodiment, N represents or corresponds to a maximum distance, e.g. 10 meters, from the reference position 134 stored in id_ref. In this manner the set of reference data can be limited to be proximal to any previously identified reference position. If there are more reference items, the index n is incremented at step 270 and the evaluation 258 and comparison 260 are repeated for the next reference item 110 in the reference dataset. However, this time, id_ref is not NULL, so if a further match is found, the error, error(n), is compared the value stored in best_error at 272. If error(n) is less than best_error, this reference item is more closely correlated with the input data than the last identified reference item. Therefore, at step 274 ref(n) or its index n is stored to id_ref and error(n) is stored to best_error. If there are no more reference items in the reference dataset, then the algorithm finishes at 276. The position of the machine 10 can then be identified according to the best matching reference item, as identified by id_ref. Alternatively, if id_ref is NULL, the controller 30 identifies that the position is unknown for this input data 102. The algorithm 250 may then be repeated for by new input data 252.

In situations where a worksite 20 includes similar features in various locations or consists of a repeating layout, a lidar based positioning system may have difficulty finding a unique match between input data 102 for a current machine position and reference data corresponding to a Lidar map of the worksite. This difficulty is particularly evident in determining an initial position for the positioning system. For example, if controller 18 were to use worksite data 108, positioning system 30 may not be able to determine the position of machine 10 with certainty and/or great accuracy or efficiency. For example, as shown, in FIG. 4, the shape of the worksite in the tunnel 113 adjacent respective drawpoints 50, is substantially similar. If machine 10 is at one of drawpoints 50, Lidar data taken from that position may be indistinguishable from any of the other drawpoints 50, or at least sufficiently indistinguishable such that positioning system cannot determine a unique position for the machine 10. Nonetheless, such a position system may identify a the wrong position as being the best match due to limitations in the matching algorithm. Further, the matching algorithm may not be optimized to identify those parts of the worksite which do have unique in shape. Further the computational demands on the processing system may be excessive if the reference data corresponds to a Lidar map for the entire worksite.

Processing system 30, however, using process 200 and algorithm 250, reduces the number of reference positions used for determining an initial match with the input data 102. The reduction of the dataset is based on position data derived from a radio-frequency communication. The reduced dataset may be may assist the matching algorithm in efficiently and/or reliably determining the initial match.

It will be understood that the disclosure in this specification extends to all alternative combinations of two or more of the individual features mentioned or evident from the text or drawings. All of these different combinations constitute various alternative aspects of the disclosure.

The invention claimed is:

1. A method for determining a position of a machine in a worksite, the method comprising:
   determining, using a Lidar unit located on the machine, input data associated with distances between the Lidar unit and respective light-reflective points in the worksite;
   transmitting a radio-frequency communication between a first signal device at a known location within the worksite and a second signal device located on the machine;
   determining position data for the machine based on at least the radio frequency communication, wherein the position data is based on a distance of the machine from the first signal device, the distance being associated with a characteristic of the radio-frequency communication; and
   determining a position of the machine based on the position data and the input data.

2. The method of claim 1, wherein determining the position of the machine based on the position data and the input data comprises:
   comparing the input data with first comparison data, the first comparison data including a plurality of reference data sets associated with a plurality of reference positions in the worksite, the reference positions having spacings from an initial position indicated by the position data that are less than a threshold spacing; and
   determining a first position of the machine based on the first comparison data when the input data and at least one reference data set in the plurality of reference data sets satisfy a predefined condition.

3. The method of claim 2, wherein when the input data and the at least one reference data set do not satisfy the predefined condition, the method further comprises:
    updating the position data based on a subsequent radio-frequency communication between the first signal device and the second signal device; and
    determining the first position of the machine based on the updated position data and the input data.

4. The method of claim 2, wherein the plurality of reference data sets is a plurality of first reference data sets, the plurality of reference positions is a plurality of first reference positions, the spacings are first spacings, and the method further includes:
    updating the input data;
    comparing the updated input data with second comparison data, the second comparison data including a plurality of second reference data sets associated with a plurality of second reference positions in the worksite, the second reference positions having second spacings from the first position that are less than a threshold spacing; and
    determining a second position of the machine based on a second reference data set in the plurality of second reference data sets corresponds to the input data.

5. The method of claim 3, wherein the characteristic is one of:
    a threshold signal strength of a signal of the radio-frequency communication at said distance from the first signal device; and
    a measured signal strength of a signal of the radio-frequency communication at said distance from the first signal device.

6. The method of claim 3, wherein the characteristic is a time-based characteristic of the radio-frequency communication.

7. The method of claim 6, wherein the radio-frequency signal communication is an ultra-wideband radio frequency communication.

8. The method of claim 6, wherein the radio frequency communication comprises at least one round-trip communication, the at least one round-trip communications comprising:
    transmitting a first signal from an initiating device, the initiating device being one of the first signal device and the second signal devices; and
    transmitting a response signal from a responding device to the initiating device, the responding device being the other of the first and second signal devices,
    wherein the time-based characterization is a two-way time-of-flight associated with the radio-frequency communication, and the position data is determined based on the two-way time-of-flight.

9. The method of claim 6, wherein the radio frequency communication is a first radio frequency communication, and the method further includes:
    transmitting a second radio frequency communication between the second signal device and a third signal device, the third signal device being at another known location in the worksite; and
    determining the position data for the machine based on the first radio frequency communication between the first and second signal devices and the second radio frequency communication between the second and third signal devices.

10. The method of claim 8, wherein transmitting a first signal and transmitting a response signal each comprise transmitting data multiple times, wherein the data is coherently processed to determine the two-way time of flight.

11. The method of claim 8, wherein the method comprises determining the position data from a plurality of determined time-of-flights, for respective round-trip communications, using a Kalman filter.

12. The method of claim 8, wherein the method comprises determining the position data for the machine based on the radio frequency communication and on motion information derived from a motion sensor.

13. The method of claim 12, wherein the position data is determined from a plurality of determined time-of-flights using a particle filter.

14. A system for determining a position of a machine in a worksite, the system comprising:
    a Lidar unit attached to the machine and configured to generate input data, the input data being associated with distances between the Lidar unit and respective light-reflective points in the worksite;
    a radio frequency communication system comprising a first signal device positioned at a known location within the worksite and a second signal device attached to the machine, the communication system being configured for transmitting a radio frequency communication between the first and second signal devices; and
    a control system in communication with the Lidar unit and the radio frequency communication system, the control system configured to:
        determine position data for the machine based on at least the radio frequency communication, wherein the position data is based on a distance of the machine from the first signal device, the distance being associated with a characteristic of the radio-frequency communication; and
        determine a position of the machine based on the position data and the input data.

15. The system of claim 14, wherein determining the position of the machine based on the position data and the input data comprises:
    comparing the input data with first comparison data, the first comparison data including a plurality of reference data sets associated with a plurality of reference positions in the worksite, the reference positions having spacings from a position indicated by the position data that are less than a threshold spacing; and
    determining a first position of the machine based on the first comparison data when the input data and at least one reference set in the plurality of reference data sets satisfy a predefined condition.

16. The system of claim 14, wherein the radio frequency communication comprises at least one round-trip communication, each of the at least one round-trip communications comprising:
    transmitting a first signal from an initiating device, the initiating device being one of the first signal device and the second signal devices; and
    transmitting a response signal from a responding device to the initiating device, the responding device being the other of the first and second signal devices,
    wherein the characteristic is a two-way time-of-flight associated with the radio-frequency communication.

17. The system of claim 14, wherein the first and second signal devices are ultra-wideband radio frequency ranging devices, and the radio-frequency signal communication is an ultra-wideband radio frequency communication.

18. A method for determining a position of a machine in a worksite, the method comprising:

determining, using a Lidar unit located on the machine, associated with distances between the Lidar unit and respective light-reflective points in the worksite;

transmitting an ultra-wideband radio-frequency communication between a first signal device at a known location within the worksite and a second signal device located on the machine;

determining position data for the machine based on a distance of the machine from the first signal device, the distance being determined based at least on a two-way time-of-flight associated with the ultra-wideband radio frequency communication between the first and second signal devices; and determining the position of the machine based on the position data and the input data.

* * * * *